US011772983B2

(12) United States Patent
Yamada et al.

(10) Patent No.: US 11,772,983 B2
(45) Date of Patent: Oct. 3, 2023

(54) TITANIA POROUS BODY AND METHOD FOR PRODUCING SAME

(71) Applicants: NGK INSULATORS, LTD., Nagoya (JP); EMAUS KYOTO, INC., Kyoto (JP)

(72) Inventors: Kazunari Yamada, Nagoya (JP); Hideki Shimizu, Obu (JP); Norio Ishizuka, Kyoto (JP); Toshikazu Oda, Uji (JP); Kyoko Konishi, Hirakata (JP)

(73) Assignees: NGK INSULATORS, LTD., Nagoya (JP); EMAUS KYOTO, INC., Kyoto (JP)

( * ) Notice: Subject to any disclaimer, the term of this patent is extended or adjusted under 35 U.S.C. 154(b) by 324 days.

(21) Appl. No.: 16/942,016

(22) Filed: Jul. 29, 2020

(65) Prior Publication Data

US 2020/0354228 A1    Nov. 12, 2020

Related U.S. Application Data

(63) Continuation of application No. PCT/JP2019/001680, filed on Jan. 21, 2019.

(30) Foreign Application Priority Data

Feb. 14, 2018 (WO) ............. PCT/JP2018/004975

(51) Int. Cl.
*C01G 23/053* (2006.01)
*C01G 23/08* (2006.01)

(52) U.S. Cl.
CPC ........... *C01G 23/053* (2013.01); *C01G 23/08* (2013.01); *C01P 2004/03* (2013.01); *C01P 2006/17* (2013.01)

(58) Field of Classification Search
CPC ... C01G 23/053; C01G 23/08; C01P 2004/03; C01P 2006/17; C01P 2006/12;
(Continued)

(56) References Cited

U.S. PATENT DOCUMENTS

2005/0169829 A1    8/2005    Dai et al.
2009/0123358 A1    5/2009    Costa et al.
(Continued)

FOREIGN PATENT DOCUMENTS

CN    101503212 A    8/2009
JP    2008-532898 A1    8/2008
(Continued)

OTHER PUBLICATIONS

WO2007021037A1 Google Patents Translaton (Year: 2007).*
(Continued)

*Primary Examiner* — Colin W. Slifka
*Assistant Examiner* — Logan Edward Laclair
(74) *Attorney, Agent, or Firm* — BURR PATENT LAW, PLLC

(57) ABSTRACT

A titania porous body is entirely formed of titania. The titania porous body includes a titania framework, first pores, and second pores. The titania framework forms a three-dimensional network structure. The first pores are opening portions of the three-dimensional structure. The second pores are disposed in a surface of the titania framework. Such a titania porous body is also referred to as a titania monolith.

11 Claims, 4 Drawing Sheets

(58) Field of Classification Search
CPC .............. C01P 2006/14; C01P 2006/16; C04B 35/63488; C04B 38/067; C04B 35/624; C04B 2111/00827; C04B 2235/3232; C04B 2235/441; C04B 35/46
See application file for complete search history.

(56) References Cited

U.S. PATENT DOCUMENTS

| | | |
|---|---|---|
| 2013/0241097 A1 | 9/2013 | Ippommatsu et al. |
| 2015/0037236 A1 | 2/2015 | Kageyama et al. |
| 2018/0037468 A1 | 2/2018 | Miyamoto |

FOREIGN PATENT DOCUMENTS

| | | | | |
|---|---|---|---|---|
| JP | 2012-111655 A1 | 6/2012 | | |
| WO | 2007/021037 A1 | 2/2007 | | |
| WO | WO-2007021037 A1 * | 2/2007 | .......... | B01J 20/0211 |
| WO | 2013/121801 A1 | 8/2013 | | |
| WO | 2016/136799 A1 | 9/2016 | | |

OTHER PUBLICATIONS

WO2007021037A1 Google Patents translation (Year: 2022).*
Yu et al (Hydrothermal Preparation and Photocatalytic Activity of Hierarchically Sponge-like Macro-/Mesoporous Titania, The Journal of Physical Chemistry, 2007) (Year: 2007).*
Extended European Search Report (Application No. 19754624.5) dated Oct. 8, 2021.
Sun Wei et al., "Facile Fabrication and High Photoelectric Properties of Hierarchically Ordered Porous $TiO_2$," *Chemistry of Materials*, vol. 24, No. 19, Oct. 9, 2012, pp. 3800-3810.
English translation of the International Preliminary Report on Patentability (Chapter I)(Application No. PCT/JP2019/001680) dated Aug. 27, 2020.
George Hasegawa, et al., "Facile Preparation of Hierarchically Porous $TiO_2$ Monoliths," *Journal of American Ceramic Society*, vol. 93, No. 10, 2010, pp. 3110-3115.
George Hasegawa, "Fabrication of Porous Titania Monoliths and Their Surface Modification with Flower-Like Morphologies," *The Ceramic Society of Japan, Ceramics*, vol. 52, No. 7, 2017, pp. 488-489 (with English translation).
International Search Report and Written Opinion (Application No. PCT/JP2019/001680) dated Mar. 26, 2019.
Chinese Office Action (Application No. 201980012711.1) dated Jan. 17, 2022 (with English translation).

* cited by examiner

TITANIA POROUS BODY AND METHOD FOR PRODUCING SAME

BACKGROUND OF THE INVENTION

1. Field of the Invention

The present invention relates to a titania porous body and a method for producing the same.

2. Description of the Related Art

Titania ($TiO_2$) porous bodies can be utilized in fields such as photocatalysts and chromatography. Titania porous bodies that have been reported include those produced by using a sol-gel method in which a titanium alkoxide, polyethylene oxide (PEO), an inorganic salt, and a chelating agent are used, and phase separation is involved (Non-Patent Literature 1 and 2). The macropores (pores having a narrow distribution in the micrometer region) of such titania porous bodies can be formed by freezing the co-continuous structure, which is a transitional structure in spinodal decomposition, through the sol-gel transition. A pore diameter of the macropores increases as an amount of the PEO increases.

CITATION LIST

Non Patent Literature

NPL 1: J. Am. Ceram. Soc., 93[10], 3110-3115 (2010)
NPL 2: Ceramics Japan Vol. 52 (2017) No. 7, pp. 488-489

SUMMARY OF THE INVENTION

Unfortunately, technologies for forming pores in a surface of the framework of a titania porous body entirely formed of titania have been unknown in the past. It should be noted that NPTL 2 discloses an example in which a flower-like structure is incorporated into a surface of a titania porous body; however, the flower-like structure is a plate-like crystal of lithium titanate, and, therefore, this titania porous body is not a titania porous body entirely formed of titania.

The present invention has been made to solve the problem described above, and a principal object of the present invention is to provide a titania porous body having a novel structure.

According to the present invention, a titania porous body is a titania porous body entirely formed of titania. The titania porous body includes a titania framework, first pores, and second pores. The titania framework forms a three-dimensional network structure. The first pores are opening portions of the three-dimensional network structure. The second pores are disposed in a surface of the titania framework.

The titania porous body includes the first pores, which are opening portions of a titania framework that forms a three-dimensional network structure, and the second pores, which are disposed in a surface of the titania framework. Such a structure, that is, a structure including second pores in a surface of the titania framework, in addition to first pores that are opening portions, has been unknown in the past, regarding a titania porous body entirely formed of titania. Accordingly, the titania porous body is expected to be utilized in new fields such as photocatalysts and chromatography; examples of the fields include the separation and purification of therapeutic proteins produced by using a culturing technique. Note that the second pores disposed in a surface of the titania framework may include recesses disposed in the surface and include pores extending inwardly from the surface.

The titania porous body described above may include third pores. The third pores are pores disposed in a surface of the titania framework and having a smaller pore diameter than the second pores. The third pores extend inwardly from the surface of the titania framework and are highly likely to be through-holes.

According to the present invention, a method for producing a titania porous body includes a step (a1), a step (a2), and a step (a3) or includes a step (b1), a step (b2), and a step (b3). In the step (a1), a gel is formed from a dispersion liquid while the dispersion liquid is allowed to stand. The dispersion liquid includes soluble particles, a titanium (IV) alkoxide, a chelating agent, a porogen, and an inorganic salt, the soluble particles being dispersed in the dispersion liquid. The soluble particles are soluble in a predetermined liquid. In the step (a2), the chelating agent is removed from the gel obtained. In the step (a3), the gel, from which the chelating agent has been removed, is immersed in the predetermined liquid to dissolve the soluble particles into the predetermined liquid, and thereafter the gel is fired at a predetermined firing temperature, and, accordingly, the titania porous body described above is obtained; or the gel, from which the chelating agent has been removed, is fired at a predetermined firing temperature, and thereafter the gel is immersed in the predetermined liquid to dissolve the soluble particles into the predetermined liquid, and, accordingly, the titania porous body described above is obtained. In the step (b1), a gel is formed from a dispersion liquid while the dispersion liquid is allowed to stand. The dispersion liquid includes flammable particles, a titanium (IV) alkoxide, a chelating agent, a porogen, and an inorganic salt, the flammable particles being dispersed in the dispersion liquid. The flammable particles are particles to be burned off at a predetermined temperature. In the step (b2), the chelating agent is removed from the gel obtained. In the step (b3), the gel, from which the chelating agent has been removed, is fired at a predetermined firing temperature, and, accordingly, the titania porous body described above is obtained.

In the production method, the first pores are formed by phase separation-type spinodal decomposition in a sol-gel method, and the second pores are formed by using a template (soluble particles or flammable particles). Thus, the pore diameter of the first pores and the pore diameter of the second pores can be controlled independently. Accordingly, the pore diameters of the first pores and the second pores of the titania porous body can be easily made to be close to the respective design values.

DETAILED DESCRIPTION OF THE INVENTION

Figure 1:
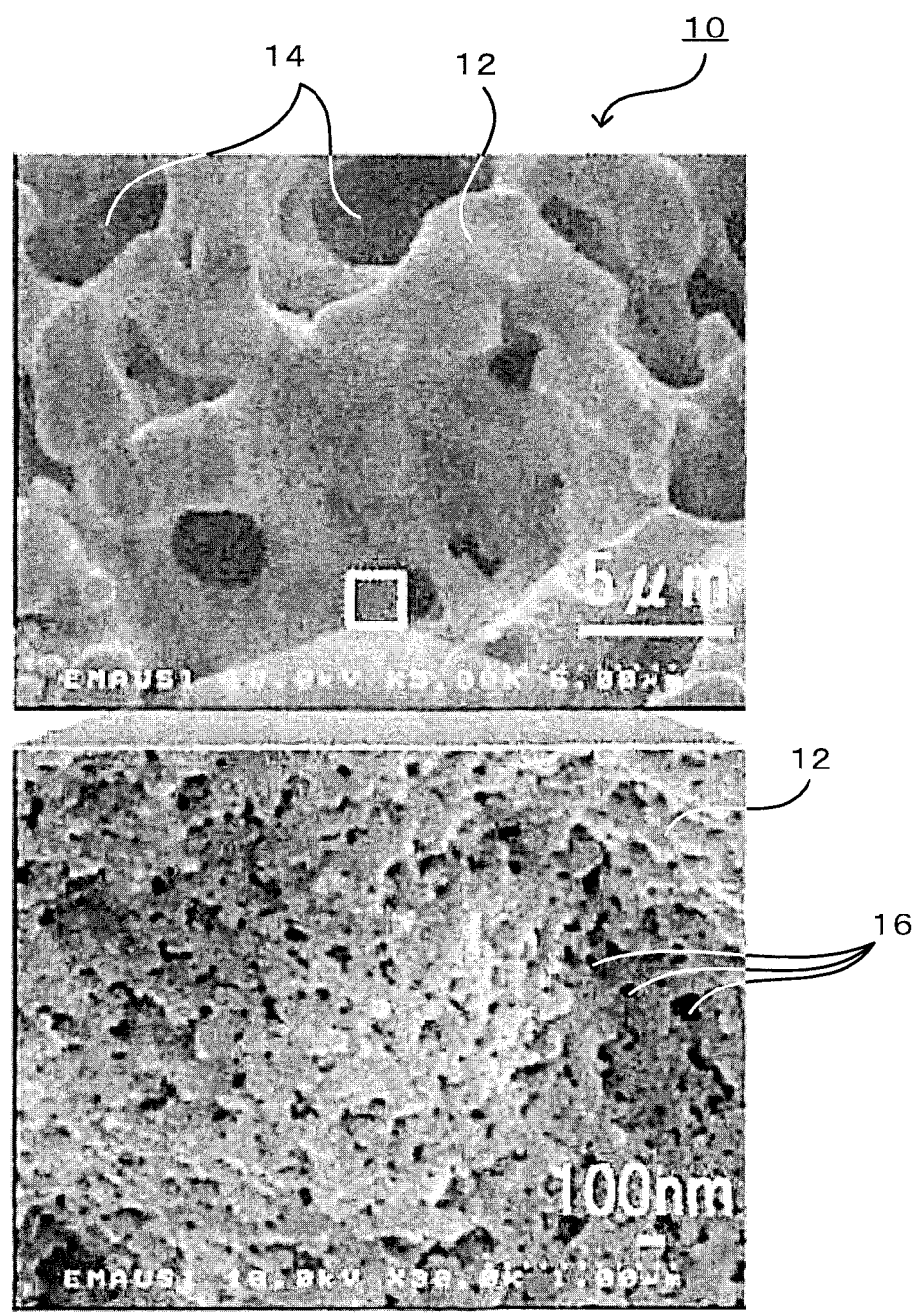
FIG. 1 is an SEM photograph (with an enlarged photograph) of a titania porous body 10.

Preferred embodiments of the present invention will be described below. FIG. 1 is an SEM photograph of a titania porous body 10, according to an embodiment. In FIG. 1, the lower photograph is a photograph showing an enlarged view of the portion surrounded by the white square frame of the upper photograph.

The titania porous body 10 is entirely formed of titania. As shown in FIG. 1, the titania porous body 10 includes a titania framework 12, first pores 14, and second pores 16. The titania framework 12 forms a three-dimensional network structure. The first pores 14 are opening portions of the three-dimensional network structure. The second pores 16 are disposed in a surface of the titania framework 12. The titania may be of the rutile type but preferably be of the anatase type. The titania porous body 10 may include small amounts of a residual portion of a template (described later) used to form the second pores 16 and/or a residual portion of a material used to remove the template by dissolution. Note that a titania porous body including a titania framework and first pores is also referred to as a titania monolith.

It is preferable that the first pores 14 have a pore diameter greater than 0.05 μm. The pore diameter is more preferably 0.05 to 50 μm and even more preferably 1 to 5 μm. It is preferable that the second pores 16 have a pore diameter of 20 to 200 nm. The pore diameter is more preferably 50 to 150 nm and even more preferably 75 to 130 nm. It is preferable that the pore diameter of the second pores 16 be smaller than the pore diameter of the first pores 14. The pore diameter of the first pores is measured by mercury intrusion porosimetry. The pore diameter of the second pores is measured by BET (nitrogen adsorption method). Note that minute gaps or pores having a pore diameter of approximately several nanometers may be present between crystallites of the titania that constitute the titania framework 12.

The titania porous body 10 may include third pores. The third pores extend inwardly from a surface of the titania porous body 10 and are highly likely to be through-holes. It is believed that some third pores extend inwardly from a surface of the second pores 16. The third pores cannot be observed in an electron micrograph. However, by BET (nitrogen adsorption method), the existence of the third pores can be confirmed, and a pore diameter thereof can be measured. It is believed that the third pores are gaps between crystal grains of the titania. The pore diameter of the third pores is smaller than the pore diameter of the second pores 16. In the case where the titania porous body 10 includes the third pores, the pore diameter of the second pores 16 is preferably 35 to 200 nm and more preferably 70 to 200 nm, and the pore diameter of the third pores is preferably 3 to 100 nm and more preferably 5 to 70 nm.

Titania porous bodies 10, as described above, are produced in accordance with, for example, Production Example 1 or 2, which is described below. It is to be noted that titania porous bodies 10 may be produced by using a method other than that of Production Example 1 or 2.

Production Example 1

Production Example 1 includes a step (a1), a step (a2), and a step (a3). In the step (a1), a gel is formed from a dispersion liquid while the dispersion liquid is allowed to stand. The dispersion liquid includes soluble particles, a titanium (IV) alkoxide, a chelating agent, a porogen, and an inorganic salt, the soluble particles being dispersed in the dispersion liquid. The soluble particles are soluble in a predetermined liquid. In the step (a2), the chelating agent is removed from the gel obtained. In the step (a3), the gel, from which the chelating agent has been removed, is immersed in the predetermined liquid to dissolve the soluble particles into the predetermined liquid, and thereafter the gel is fired at a predetermined firing temperature, and, accordingly, a titania porous body 10 is obtained, or the gel, from which the chelating agent has been removed, is fired at a predetermined firing temperature, and thereafter the gel is immersed in the predetermined liquid to dissolve the soluble particles into the predetermined liquid, and, accordingly, a titania porous body 10 is obtained.

Step a1: Gel-Forming Step

The soluble particles are particles that are soluble in a predetermined liquid. Examples of the predetermined liquid include alkaline solutions. In the instance, the soluble particles to be used are particles that are soluble in an alkaline solution. Examples of such particles include silica particles and silicate salt particles (e.g., silicate glass particles). The silica particles are used to form the second pores. A particle diameter of the silica particles is preferably 7 to 500 nm, more preferably 20 to 300 nm, and even more preferably 30 to 200 nm. Silica particles include hydrophilic silica particles and hydrophobic silica particles; either type may be employed. Examples of the silica particles include Seahostar (registered trademark) KE-S10 and KE-P10, manufactured by Nippon Shokubai Co., Ltd., and NAX-50 (trade name), manufactured by Nippon Aerosil Co., Ltd. An amount of use of the soluble particles is preferably 2 to 50% and more preferably 5 to 30%, in a weight ratio relative to the titanium (IV) alkoxide.

Examples of the titanium (IV) alkoxide include titanium (IV) methoxide, titanium (IV) ethoxide, titanium (IV) n-propoxide, titanium (IV) isopropoxide, titanium (IV) n-butoxide, titanium (IV) isobutoxide, titanium (IV) sec-butoxide, and titanium (IV) tert-butoxide. Of these, titanium (IV) n-propoxide and titanium (IV) isopropoxide are preferable.

Preferably, the chelating agent is one that can be coordinated to titanium ions and which is decarboxylated after being hydrolyzed. Examples of the chelating agent include β-ketoesters. Examples of the β-ketoesters include acetoacetic acid alkyl esters, such as ethyl acetoacetate. An amount of use of the chelating agent is preferably 0.1 to 2.0 and more preferably 0.5 to 1.5, in a molar ratio relative to the titanium (IV) alkoxide.

A porogen is an additive substance used to form first pores and is also referred to as a phase separation agent because a porogen induces phase separation in a sol-gel reaction. Typically, examples of porogens that cause spinodal decomposition include cellosolves, such as methyl cellosolve and ethyl cellosolve, esters, such as ethylene glycol monomethyl ether acetate and propylene glycol monomethyl ether acetate, and glycols, such as polyethylene glycol, polypropylene glycol, triethylene glycol, and diethylene glycol. For the formation of the titania porous body of the embodiment, polyalkylene glycols, such as polyethylene glycol and polypropylene glycol, are preferable, and a molecular weight thereof is preferably greater than or equal to 2000 and less than or equal to 500000 and more preferably greater than or equal to 6000 and less than or equal to 100000. The polyalkylene glycol is sometimes referred to as the polyalkylene oxide, depending on the molecular weight. In this specification, these are collectively referred to as the polyalkylene glycol. The pore diameter of the first pores 14 of the titania porous body 10 that is finally obtained can be controlled by adjusting the molecular weight of the porogen and an amount of addition thereof. The porogen may be one porogen or two or more porogens used in combination. An amount of use of the porogen is preferably greater than or equal to 1% and less than or equal to 20% and more preferably greater than or equal to 3% and less than 10%, in a weight ratio relative to the titanium (IV) alkoxide.

Preferably, the inorganic salt is a salt including a conjugate base of a strong acid. Examples of the conjugate base of a strong acid include nitrate ions and halogen ions. Examples of such inorganic salts include ammonium nitrate, ammonium chloride, ammonium bromide, and ammonium iodide. Note that the conjugate base of a strong acid serves as a blocking agent that prevents titanium atoms from being subjected to a nucleophilic reaction. An amount of use of the inorganic salt is preferably 0.005 to 0.5 and more preferably 0.01 to 0.3, in a molar ratio relative to the titanium (IV) alkoxide.

Figure 2:
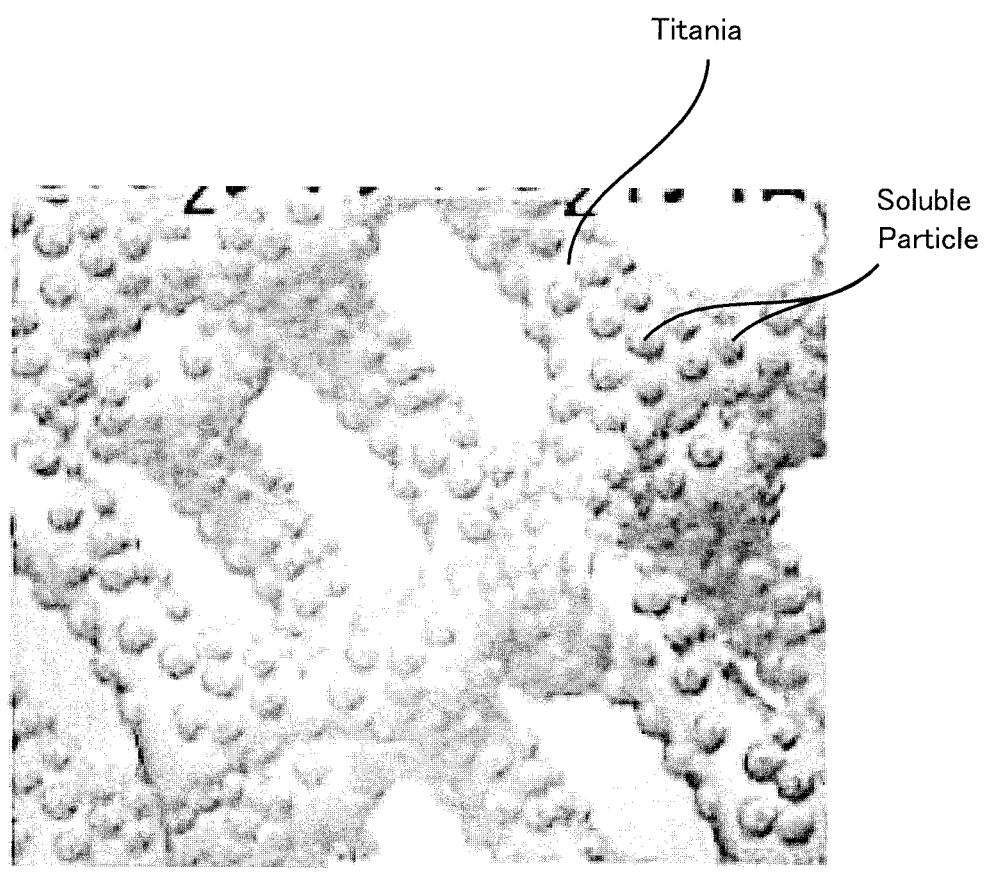
FIG. 2 is a schematic diagram illustrating a state in which soluble particles adhere to a surface of a titania framework.

The formation of the gel is carried out by, for example, adding an aqueous solution of an inorganic salt dropwise to a dispersion liquid and performing mixing and subsequently leaving the mixture to stand. The dispersion liquid includes a mixed solution and soluble particles dispersed therein. The mixed solution includes a chelating agent, a porogen, and a titanium (IV) alkoxide, which are dissolved in a solvent. Examples of the solvent include, but are not limited to, alcohol-based solvents, ester-based solvents, and glycol-based solvents. When the aqueous solution of an inorganic salt is added dropwise to the dispersion liquid in which soluble particles are dispersed, a titania sol in which the soluble particles are dispersed can be obtained. The temperature of the dispersion liquid at which the dropwise addition is carried out and the temperature of the titania sol at which the titania sol is left to stand may be set appropriately. For example, the temperatures may be room temperature or may be increased to 30 to 80° C. In these processes, higher temperatures result in smaller pore diameters of the first pores. When the titania sol becomes a gel while the titania sol is allowed to stand, phase separation occurs, and thus the solid and the liquid are separated from each other and become a titania framework (the solid phase), which forms a three-dimensional network structure, and opening portions (the liquid phase). In this instance, a surface of the titania framework is in a state in which the soluble particles adhere thereto (see FIG. 2). Specifically, the state is a state in which, assuming that one of the soluble particles is observed, a portion of the soluble particle is embedded in the surface of the titania framework, and the remaining portion thereof is exposed on the surface of the titania framework. The state may be a state in which a portion of an aggregate, not a single particle, is embedded in the surface of the titania framework. This is because silica particles or the like that may be used as the soluble particles are small and, therefore, tend to aggregate. Note that when the titania sol becomes a gel, if no porogen is present in the titania sol, the entirety thereof uniformly becomes a gel, or the gel portion and the solvent portion are simply separated from each other.

Step a2: Chelating Agent Removing Step

The chelating agent is removed from the gel obtained. In a case where a β-ketoester is used as the chelating agent, the chelating agent is removed by using an alcohol-water mixed liquid. This step is carried out in stages by using alcohol-water mixed liquids having different alcohol concentrations. Specifically, first, the gel is immersed in a mixed liquid having a high alcohol concentration, and in the next and subsequent stages, the alcohol concentration of the mixed liquid in which the gel is to be immersed is reduced in increments. In this step, after the β-ketoester is hydrolyzed, decarboxylation occurs, and, therefore, a gas is generated. Accordingly, it is preferable that the step be carried out in a state in which the vessel is unsealed and opened. Note that it is not preferable to immediately immerse in water the gel obtained because in such a case, carbon dioxide gas due to the decomposition of the chelating agent is rapidly generated, which results in formation of cracks. It is believed that as a result of the removal of the chelating agent, the titania of the gel obtained is changed from amorphous to crystalline (e.g., an anatase-type crystal).

Step a3: Removal of Soluble Particles and Firing Step

Figure 3:
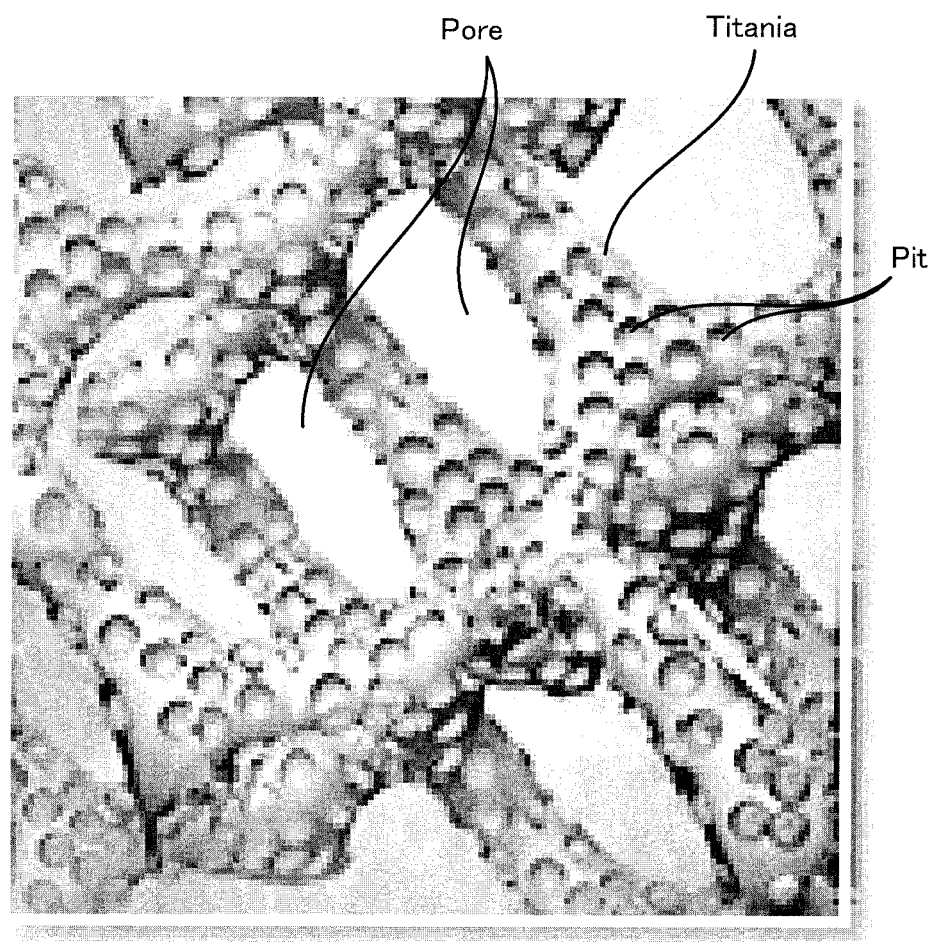
FIG. 3 is a schematic diagram illustrating a state in which pits are formed in a surface of a titania framework.

The gel, from which the chelating agent has been removed, is immersed in a predetermined liquid to dissolve the soluble particles into the predetermined liquid, thereby removing the soluble particles from the gel. Thereafter, the gel is fired at a predetermined firing temperature, and, accordingly, the titania porous body 10 described above is obtained. The method in which the soluble particles are etched away before firing as described is hereinafter referred to as a "pre-firing etching method". In the removal of the soluble particles, the soluble particles adhering to the surface of the titania framework are dissolved, and as a result, pits are formed in the surface of the titania framework. A schematic diagram of this instance is provided in FIG. 3. These pits eventually become the second pores 16 of the titania porous body 10. Accordingly, the pore diameter of the second pores 16 can be controlled by adjusting a particle diameter of the soluble particles. Furthermore, a total volume of the second pores 16 can be controlled by adjusting an amount of addition of the soluble particles. It is preferable that the firing temperature be set to be within a range of 400 to 1200° C. (preferably 400 to 1100° C., and more preferably 400 to 1000° C.). When the firing temperature is within this range, most of the organic compounds (e.g., the chelating agent) remaining in the gel are burned off. When the firing temperature is 400 to 600° C., anatase-type titania is formed, and when the firing temperature is above 600° C., rutile-type titania increases. The pore diameter of the first pores 14 can be controlled by adjusting the molecular weight of the porogen, the amount of addition thereof, and the gel-forming temperature.

Alternatively, the gel, from which the chelating agent has been removed, may be fired at a predetermined firing temperature, and thereafter the gel may be immersed in the predetermined liquid to dissolve the soluble particles into the predetermined liquid, and accordingly, the titania porous body 10 described above may be obtained. The method in which the soluble particles are etched away after firing as described is hereinafter referred to as a "post-firing etching method". It is preferable that the firing temperature be set to be within a range of 400 to 1200° C. (preferably 400 to 1100° C., and more preferably 400 to 1000° C.). When the firing temperature is within this range, most of the organic compounds (e.g., the chelating agent) remaining in the gel are burned off. When the firing temperature is 400 to 600° C., anatase-type titania is formed, and when the firing temperature is above 600° C., rutile-type titania increases. The pore diameter of the first pores 14 can be controlled by adjusting the molecular weight of the porogen, the amount of addition thereof, and the gel-forming temperature. Since the soluble particles are dissolved into the predetermined liquid and thereby removed, pits are formed in the surface of the titania framework as a result of the dissolution of the soluble particles adhering to the surface of the titania framework. These pits eventually become the second pores 16 of the titania porous body 10. Accordingly, the pore diameter of the second pores 16 can be controlled by adjusting the particle diameter of the soluble particles. Furthermore, a total volume of the second pores 16 can be controlled by adjusting an amount of addition of the soluble particles.

In the pre-firing etching method, as the firing temperature increases, the number of the third pores, which have a smaller pore diameter than the second pores, decreases. In the post-firing etching method, a large number of the third pores remain even when the firing temperature is increased, and moreover, there is a tendency for the pore diameter of the third pores to increase as the firing temperature increases. It is speculated that a reason for the tendency observed in the post-firing etching method is as follows: since the soluble particles exist on the surface of the gel during firing, deformation of the titania due to crystallization is inhibited by the soluble particles, and as a result, the third pores remain. When the pore diameter of the third pores is less than or equal to 10 nm as measured by BET, not much effect is expected for protein adsorption and the like because the pore diameter is too small. When the pore diameter is greater than 10 nm, effective use for protein adsorption and the like is possible. When the firing temperature is 900 to 1200° C. (preferably 900 to 1100° C.) in the post-firing etching method, a rutile-type titania porous body having the first pores, the second pores, and the third pores can be obtained. Reasons for setting the firing temperature to be within the above-mentioned range are as follows. At temperatures higher than or equal to 900° C., the rutile-type titania can be sufficiently obtained. At temperatures lower than or equal to 1200° C., the first pores and the second pores are sufficiently formed. At temperatures lower than or equal to 1100° C., third pores are also sufficiently formed. The rutile-type titania has little or no photocatalytic function and, therefore, has little influence on living organisms. Furthermore, there have been no reported examples of rutile-type titania porous bodies as far as the present inventors know.

Production Example 2

Production Example 2 includes a step (b1), a step (b2), and a step (b3). In the step (b1), a gel is formed from a dispersion liquid. The dispersion liquid includes flammable particles, a titanium (IV) alkoxide, a chelating agent, a porogen, and an inorganic salt. Flammable particles are dispersed in the dispersion liquid. The flammable particles are particles to be burned off at a predetermined temperature. In the step (b2), the chelating agent is removed from the gel obtained. In the step (b3), the gel, from which the chelating agent has been removed, is fired at a predetermined firing temperature, and, accordingly, a titania porous body 10 is obtained.

Step b1: Gel-Forming Step

The flammable particles are particles to be burned off at a predetermined temperature. Examples of the predetermined temperature include the firing temperature used in step b3. Examples of the flammable particles include organic particles, such as acrylic-based particles, melamine-based particles, polyester-based particles, polystyrene-based particles, and nylon-based particles. Of these, acrylic-based particles are preferable because acrylic-based particles can be easily burned off. An amount of use of the flammable particles is preferably 1 to 50% and more preferably 3 to 25%, in a weight ratio relative to the titanium (IV) alkoxide. Descriptions of the titanium (IV) alkoxide, the chelating agent, the porogen, and the inorganic salt are omitted here because descriptions thereof are provided above in step a1.

The formation of the gel is carried out by, for example, adding an aqueous solution of an inorganic salt dropwise to a dispersion liquid and subsequently leaving the resultant as it is. The dispersion liquid includes a mixed solution and flammable particles dispersed therein. The mixed solution includes a chelating agent, a porogen, and a titanium (IV) alkoxide, which are dissolved in a solvent. A description of the gel formation is omitted here because the gel formation is the same as the gel formation of step a1 except that flammable particles are used instead of soluble particles.

Step b2: Chelating Agent Removing Step

A description of this step is omitted here because this step is the same as step a2.

Step b3: Removal of Flammable Particles and Firing Step

The gel, from which the chelating agent has been removed, is fired at a predetermined firing temperature, and, accordingly, a titania porous body 10 is obtained. The flammable particles adhering to a surface of the titania framework are burned off during the firing, and as a result, pits are formed in the surface of the titania framework. It is preferable that the firing temperature be set to be within a range of 400 to 1200° C. (preferably 400 to 1100° C., and more preferably 400 to 1000° C.). When the firing temperature is within this range, most of the organic compounds (e.g., the chelating agent) remaining in the gel are burned off. When the firing temperature is 400 to 600° C., anatase-type titania is formed, and when the firing temperature is above 600° C., rutile-type titania increases. The pore diameter of the first pores 14 can be controlled by adjusting the molecular weight of the porogen, the amount of addition thereof, and the gel-forming temperature. The pore diameter of the second pores 16 of the titania porous body 10 that is finally obtained can be controlled by adjusting a particle diameter of the flammable particles. Furthermore, a total volume of the second pores 16 can be controlled by adjusting an amount of addition of the flammable particles.

The titania porous body 10 can be utilized in fields such as photocatalysts and chromatography. Specifically, the titania porous body 10 is treated with a surface modifying agent having functional groups that react with both —OH groups present on a surface of the titania porous body 10 and functional groups (e.g., —NH$_2$ groups or —COOH groups) present on a surface of a biomaterial A; as a result, the titania porous body 10 and the biomaterial A are bound together. For example, the —OH groups of the titania porous body 10 may be modified with aminopropyltriethoxysilane to immobilize Protein A thereon; accordingly, the titania porous body 10 can be utilized as a chromatographic carrier for antibody separation and purification. Consequently, utilization in a purification step of a biopharmaceutical process is expected. For example, first, a protein (medicine) is produced by placing animal cells, a virus, water, and nutrients in a culture vessel and culturing the virus. Next, the cells are removed from the culture medium by centrifugation or by MF membrane separation (MF stands for microfiltration), and the culture medium, from which the cells have been removed, is passed through a column in which the titania porous body 10 is used as a stationary phase. Accordingly, impurities are removed. Subsequently, the virus is removed to extract a target protein. Thus, a biopharmaceutical can be obtained in high purity. In other fields, examples of applications include photocatalytic devices, dye-sensitized solar cells, fuel cell materials, lithium ion battery materials, heat-shielding pigments, white pigments, UV-shielding pigments, ethanol reforming catalyst supports, sound-absorbing materials, hydrogen carrier storage materials, porous electrochromic electrodes, flexible light scattering elements for organic EL illumination, titanium oxide-coated medical instruments, culture supports, antimicrobial masks, and water or air purification filters.

The titania porous body 10, described above, is entirely formed of titania and has a novel structure including the second pores 16, which are disposed in a surface of the titania framework 12, in addition to the first pores 14, which are opening portions of the titania framework 12 that forms a three-dimensional network structure. Accordingly, the titania porous body 10 is expected to be utilized in new fields such as photocatalysts and chromatography; examples of the fields include the separation and purification of therapeutic proteins produced by using a culturing technique. Furthermore, in a case where the titania porous body 10 includes third pores, which have a smaller pore diameter than the second pores 16, the third pores are expected to be utilized for protein adsorption and the like.

Furthermore, in the above-described methods for producing a titania porous body 10, the first pores 14 are formed by phase separation-type spinodal decomposition in a sol-gel method, and the second pores 16 are formed by using a template (soluble particles or flammable particles). Thus, the pore diameter of the first pores 14 and the pore diameter of the second pores 16 can be controlled independently. Accordingly, a titania porous body 10 in which the pore diameters of the first pores 14 and the second pores 16 are close to the respective design values can be easily produced. For example, the pore diameter of the first pores 14 can be controlled by the amount of addition of a porogen, the firing temperature, or the like, and the pore diameter of the second pores 16 can be controlled by the particle diameter of the template (soluble particles or flammable particles) or the like. In a case where the third pores are to be formed in the titania porous body 10, the pore diameter of the third pores can be controlled by the firing temperature of the post-firing etching method.

Note that the present invention is in no way limited to the embodiments described above and may be implemented in any of a variety of forms that fall within the technical scope of the present invention.

EXAMPLES

Example 1

Gel-Forming Step 5.04 g of titanium (IV) propoxide (manufactured by Aldrich Chemical Company, Inc.), 2.58 g of ethyl acetoacetate (manufactured by Tokyo Chemical Industry Co., Ltd.), and 2.01 g of 1-propanol (manufactured by Tokyo Chemical Industry Co., Ltd.) were weighed into a No. 7 sample tube and then stirred to give a homogeneous mixed solution. Hydrophilic silica particles (Seahostar (registered trademark) KE-S10, manufactured by Nippon Shokubai Co., Ltd., a particle diameter of approximately 100 nm) were used as the soluble particles; 0.756 g (15 wt % relative to an amount of the titanium (IV) propoxide) of the hydrophilic silica particles were added to the mixed solution, which was then stirred until homogeneous using a stirrer. Next, 0.40 g of polyethylene glycol (manufactured by Aldrich Chemical Company, Inc.), which had a molecular weight of 10000, was added to the mixed solution and dissolved at 60° C. Subsequently, the temperature of the liquid was reduced to 40° C. Next, 1 mL of 1 M aqueous ammonium nitrate solution was added dropwise in portions over 3 minutes under sufficient stirring using a stirrer. Thus, a clear yellow polymer solution was obtained. The stir bar of the stirrer was taken out from the screw-top vial containing the polymer solution. Subsequently, the screw-top vial was capped and allowed to stand in a 40° C. thermostat, and, accordingly, a gel-forming reaction was carried out for 24 hours.

Chelating Agent Removing Step

First to fourth solutions, which were ethyl alcohol (manufactured by Wako Pure Chemical Industries, Ltd.) solutions and had different concentrations, were prepared. The ratio (mass ratio) of ethyl alcohol to water was as follows: 9:1 for the first solution; 6:4 for the second solution; 3:7 for the third solution; and 0:10 for the fourth solution. Firstly, the first solution was added to the vessel, in which the gel formation was complete, in a manner such that the vessel was filled. After 1 day of standing at room temperature, the solution was discarded. Next, the second solution was added in a manner such that the vessel was filled, and after 1 day of standing at room temperature, the solution was discarded. This operation was successively performed also for the third solution and the fourth solution. Thus, the chelating agent was removed in stages. In this step, the ethyl acetoacetate, which was used as the chelating agent, was hydrolyzed to acetoacetic acid, and the acetoacetic acid was rapidly decarboxylated to form acetone and carbon dioxide gas.

Figure 4:
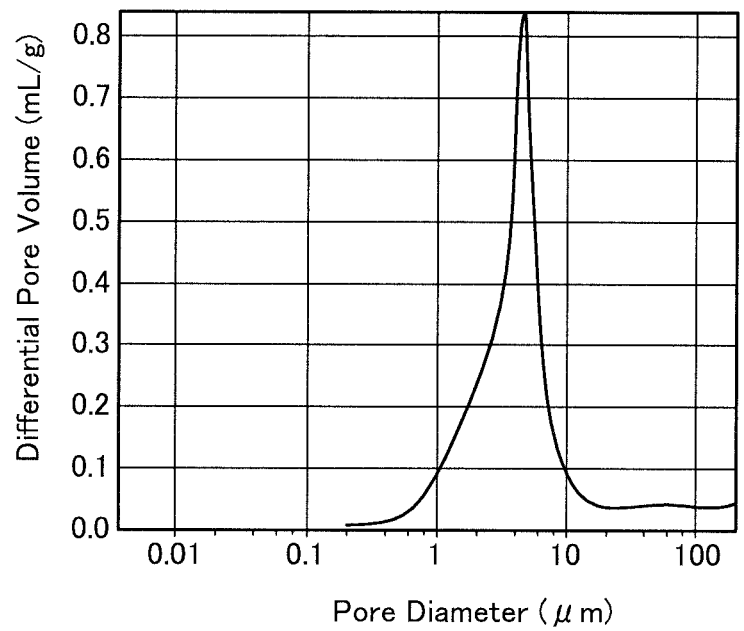
FIG. 4 is a graph illustrating a pore diameter distribution of first pores of Example 1.
Figure 5:
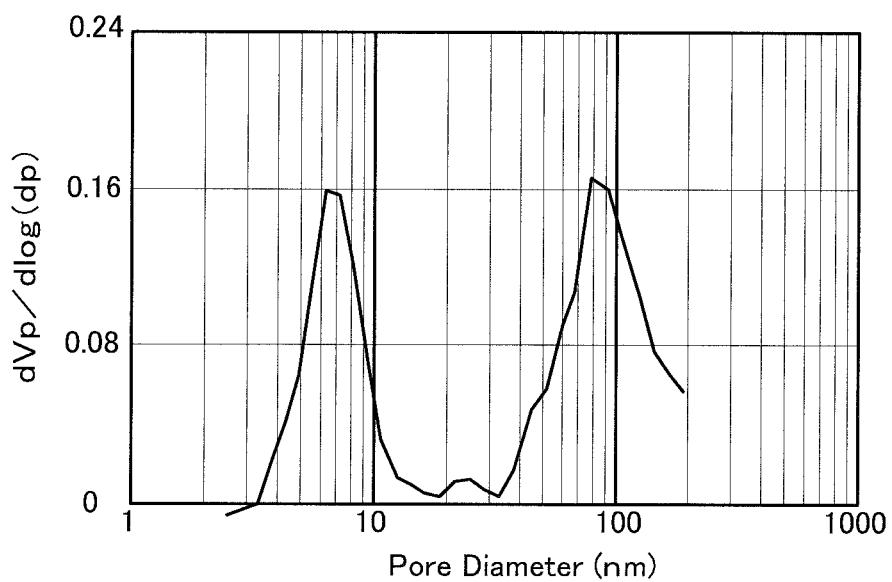
FIG. 5 is a graph illustrating pore diameter distributions of second pores and third pores of Example 1.

Removal of Silica Particles and Firing Step 43 mL of 1 M aqueous sodium hydroxide solution was added to the vessel in which the gel from which the chelating agent had been removed was placed. After 2 days of standing at room temperature, the aqueous solution was discarded. Subsequently, washing was carried out several times with ion-exchanged water, and the gel obtained was allowed to dry. Accordingly, pits were formed in a surface of the titania framework as a result of the dissolution of the silica particles, which had adhered to the surface of the titania framework, into the aqueous sodium hydroxide solution. Next, after the gel was allowed to dry, the dried gel was heated to 600° C. at a heating rate of 1° C. per minute and was then fired by being held at the temperature for 2 hours. In this manner, a titania porous body was obtained by using the pre-firing etching method. In the obtained titania porous body, the first pores had a pore diameter of 4.3 μm, the second pores had a pore diameter of 90 nm, and the third pores had a pore diameter of 6.2 nm. The pore diameters were determined as follows. Specifically, the pore diameter of the first pores was measured by mercury intrusion porosimetry over a range of 0.2 μm to 200 μm (see FIG. 4), and the pore diameters of the second pores and the third pores were measured by BET specific surface area measurement over a range of 2.5 nm to 200 nm (0.2 μm) (see FIG. 5). Furthermore, the titania porous body was found to have a specific surface area of 104 $m^2/g$ as measured by BET. In addition, the titania porous body was found to have a porosity of 47% as measured. The porosity is a porosity of the interior of the framework of the titanium dioxide monolith (the porosity is not associated with the first pores). The porosity was determined by a total volume ($cm^3/g$) of the pores of 2.5 nm to 200 nm as measured by BET specific surface area measurement. The total volume ($cm^3/g$) was calculated assuming that a specific gravity of titanium dioxide was 4.

Examples 2 and 3

In Examples 2 and 3, titania porous bodies were produced as in Example 1 except that NAX-50 (trade name) (a particle diameter of approximately 40 nm), manufactured by Nippon Aerosil Co., Ltd., was used as hydrophobic silica particles, and amounts of addition thereof were 0.454 g and 0.353 g, respectively. In the obtained titania porous body of Example 2, the first pores had a pore diameter of 3.8 μm, and the second pores had a pore diameter of 87 nm. In the obtained titania porous body of Example 3, the first pores had a pore diameter of 3.9 μm, and the second pores had a pore diameter of 76 nm. Note that the pore diameters were measured as in Example 1. Furthermore, the titania porous bodies of Example 2 and Example 3 were found to have specific surface areas of 78 $m^2/g$ and 34.3 $m^2/g$, respectively, as measured by BET. In addition, the titania porous bodies of Example 2 and Example 3 were found to have porosities of 42% and 36%, respectively, as measured.

Example 4

In Example 4, a titania porous body was produced as in Example 1 except that a removal of silica particles and firing step different from that of Example 1 was employed. The step is described below. In Example 4, in the removal of silica particles and firing step, first, the gel from which the chelating agent had been removed was heated to 600° C. at a heating rate of 1° C. per minute and was fired by being held at the temperature for 2 hours. Subsequently, the fired body was placed in a 1 M aqueous sodium hydroxide solution and allowed to stand at room temperature for 1 day to remove the silica particles from the fired body by dissolution. Washing was carried out several times with ion-exchanged water, and the resultant was allowed to dry. In this manner, a titania porous body was obtained by using the post-firing etching method. In the obtained titania porous body, the first pores had a pore diameter of 3.2 μm, and the second pores had a pore diameter of 79 nm. Note that the pore diameters were measured as in Example 1. Furthermore, the titania porous body was found to have a specific surface area of 101 $m^2/g$ as measured by BET. In addition, the titania porous body was found to have a porosity of 46% as measured.

Example 5

Gel-Forming Step 5.04 g of titanium (IV) propoxide (manufactured by Aldrich Chemical Company, Inc.), 2.58 g of ethyl acetoacetate (manufactured by Tokyo Chemical Industry Co., Ltd.), and 2.01 g of 1-propanol (manufactured by Tokyo Chemical Industry Co., Ltd.) were weighed into a No. 5 glass screw-top vial and then stirred to give a homogeneous mixed solution. Acrylic particles (MP-1451, manufactured by Soken Chemical & Engineering Co., Ltd., an average particle diameter of 150 nm) were used as the flammable particles; 0.504 g (10 wt % relative to an amount of the titanium (IV) propoxide) of the acrylic particles were added to the mixed solution, which was then stirred until homogeneous using a stirrer. Next, 0.40 g of polyethylene glycol (manufactured by Aldrich Chemical Company, Inc.), which had a molecular weight of 10000, was added to the mixed solution and dissolved at 60° C. Subsequently, the temperature of the liquid was reduced to 40° C. Next, 1 mL of 1 M aqueous ammonium nitrate solution was added dropwise in portions over 3 minutes under sufficient stirring using a stirrer. Thus, a clear yellow polymer solution was obtained. The stir bar of the stirrer was taken out from the screw-top vial containing the polymer solution. Subsequently, the screw-top vial was capped and allowed to stand in a 40° C. thermostat, and, accordingly, a gel-forming reaction was carried out for 24 hours.

Chelating Agent Removing Step

Removal of the chelating agent was carried out as in the chelating agent removing step of Example 1. Subsequently, washing was carried out with ion-exchanged water, and the resultant was allowed to dry.

Removal of Acrylic Particles and Firing Step

After the gel was allowed to dry, the gel was heated to 600° C. at a heating rate of 1° C. per minute and was then fired by being held for 2 hours. Accordingly, the acrylic particles were burned off, and the titania gel was fired. Thus, a titania porous body was obtained. In the obtained titania porous body, the first pores had a pore diameter of 4.3 μm, and the second pores had a pore diameter of 95 nm. Note that the pore diameters were measured as in Example 1. Furthermore, the titania porous body was found to have a specific surface area of 143 $m^2/g$ as measured by BET. In addition, the titania porous body was found to have a porosity of 55% as measured.

Example 6

In Example 6, a titania porous body was produced as in Example 4 except that the gel from which the chelating agent had been removed was heated to 800° C. at a heating rate of 1° C. per minute. The properties of the obtained titania porous body are shown in Table 1. By using an XRD chart of the titania porous body, quantitative analysis was conducted by RIR, and it was found that the titania porous body included 2.5% rutile-type titania with the remainder being anatase-type titania.

Example 7

In Example 7, a titania porous body was produced as in Example 6 except that OX-50 (trade name) (a particle diameter of approximately 40 nm), manufactured by Nippon Aerosil Co., Ltd., was used as hydrophilic silica particles. The properties of the obtained titania porous body are shown in Table 1.

Example 8

In Example 8, a titania porous body was produced as in Example 4 except that the gel from which the chelating agent had been removed was heated to 1000° C. at a heating rate of 1° C. per minute. The properties of the obtained titania porous body are shown in Table 1. By using an XRD chart of the titania porous body, quantitative analysis was conducted by RIR, and it was found that the titania porous body was formed of 100% rutile-type titania.

Example 9

In Example 9, a titania porous body was produced as in Example 4 except that the gel from which the chelating agent had been removed was heated to 1200° C. at a heating rate of 1° C. per minute. The properties of the obtained titania porous body are shown in Table 1. Note that regarding the titania porous body of Example 9, since the holding time taken after the heating for rutile formation was long, the reorganization of the structure of the rutile phase sufficiently proceeded, and as a result, the peaks became less pronounced; consequently, it was impossible to determine the pore diameter of the third pores.

Comparative Example 1

A fired titania body was obtained as in Example 1 except that in a step corresponding to the gel-forming step of Example 1, the gel-forming reaction was carried out without adding silica particles and polyethylene glycol, and in a step corresponding to the removal of silica particles and firing step, the process of removing silica particles (the process of dissolving silica particles into an aqueous sodium hydroxide solution) was not performed. The obtained fired titania body was a lump of titania having no first pores or second pores.

Comparative Example 2

A fired titania body was obtained as in Example 1 except that in a step corresponding to the gel-forming step of Example 1, the gel-forming reaction was carried out without adding silica particles, and in a step corresponding to the removal of silica particles and firing step, the process of removing silica particles (the process of dissolving silica particles into an aqueous sodium hydroxide solution) was not performed. The obtained fired titania body was one that had first pores (a pore diameter of 2.5 μm) but had no second pores. Note that the pore diameters were measured as in Example 1.

The results of Examples and Comparative Examples are summarized in Table 1.

TABLE 1

| | Pore Diameter of First Pore (μm) | Pore Diameter of Second Pore (nm) | Pore Diameter of Third Pore (nm) | Specific Surface Area ($m^2/g$) | Porosity (%) |
|---|---|---|---|---|---|
| Example 1 | 4.3 | 90 | 6.2 | 104 | 47 |
| Example 2 | 3.8 | 87 | 6.0 | 78 | 42 |
| Example 3 | 3.9 | 76 | 6.1 | 34.3 | 36 |
| Example 4 | 3.2 | 79 | 8.2 | 101 | 46 |
| Example 5 | 4.3 | 95 | 7.1 | 143 | 55 |
| Example 6 | 3.0 | 105 | 45 | 24.2 | 34 |
| Example 7 | 3.1 | 105 | 21.8 | 19.5 | 32 |
| Example 8 | 2.9 | 171 | 51 | 7.5 | 17 |
| Example 9 | 2.8 | 171 | — | 3.4 | 9 |
| Comparative Example 1 | — | — | — | — | — |
| Comparative Example 2 | 2.5 | — | — | — | — |

Note that the examples described above are in no way intended to limit the present invention.

The present application claims priority to International Application No. PCT/JP2018/004975 filed on Feb. 14, 2018, the entire contents of which are incorporated herein by reference.

What is claimed is:

1. A titania porous body, the titania porous body being entirely formed of titania, the titania porous body comprising:
   a titania framework formed of titania crystals and forming a three-dimensional network structure;
   first pores comprising opening portions of the three-dimensional network structure;
   second pores disposed in a surface of the titania framework formed of titania crystals; and
   third pores disposed in the surface of the titania framework formed of titania crystals and having a smaller pore diameter than the second pores;
   wherein the first pores, second pores, and third pores each have a pore diameter distribution that includes a peak, and the peak of each pore diameter distribution is at a different pore diameter.

2. The titania porous body according to claim 1, wherein the first pores have a pore diameter of 0.05 to 50 μm, and the second pores have a pore diameter of 20 to 200 nm.

3. The titania porous body according to claim 1, wherein the third pores have a pore diameter of 10 to 100 nm.

4. The titania porous body according to claim 1, wherein the titania porous body is rutile.

5. A method for producing a titania porous body, the method comprising:
   (a1) a step of forming a gel from a dispersion liquid while the dispersion liquid is allowed to stand, the dispersion liquid including soluble particles, a titanium (IV) alkoxide, a chelating agent, a porogen, and an inorganic salt, the soluble particles being dispersed in the dispersion liquid, the soluble particles being soluble in a predetermined liquid;
   (a2) a step of removing the chelating agent from the gel obtained; and
   (a3) a step of obtaining the titania porous body according to claim 1 by immersing the gel, from which the chelating agent was removed, in the predetermined liquid to dissolve the soluble particles into the predetermined liquid and thereafter firing the gel at a predetermined firing temperature; or obtaining the titania porous body according to claim 1 by firing the gel, from which the chelating agent was removed, at a predetermined firing temperature and thereafter immersing the gel in the predetermined liquid to dissolve the soluble particles into the predetermined liquid.

6. The method for producing a titania porous body according to claim 5, wherein the predetermined liquid comprises an alkaline solution, and the soluble particles comprise silica particles or silicate salt particles.

7. A method for producing a titania porous body, the method comprising:
   (b1) a step of forming a gel from a dispersion liquid while the dispersion liquid is allowed to stand, the dispersion liquid including flammable particles, a titanium (IV) alkoxide, a chelating agent, a porogen, and an inorganic salt, the flammable particles being dispersed in the dispersion liquid, the flammable particles being particles to be burned off at a predetermined temperature;
   (b2) a step of removing the chelating agent from the gel obtained; and (b3) a step of obtaining the titania porous body according to claim 1 by firing the gel, from which the chelating agent was removed, at a predetermined firing temperature.

8. The method for producing a titania porous body according to claim 7, wherein the predetermined temperature is the predetermined firing temperature, and the flammable particles comprise organic particles.

9. The method for producing a titania porous body according to claim 5, wherein the predetermined firing temperature is 400 to 1200° C.

10. The method for producing a titania porous body according to claim 7, wherein the predetermined firing temperature is 400 to 1200° C.

11. The method for producing a titania porous body according to claim 5, wherein, in the step (a3), the titania porous body is obtained by firing the gel, from which the chelating agent was removed, at a firing temperature of 900 to 1200° C., and thereafter immersing the gel in the predetermined liquid to dissolve the soluble particles into the predetermined liquid.

\* \* \* \* \*